(12) United States Patent
Grimsrud et al.

(10) Patent No.: US 6,862,657 B1
(45) Date of Patent: Mar. 1, 2005

(54) READING DATA FROM A STORAGE MEDIUM

(75) Inventors: Knut S. Grimsrud, Forest Grove, OR (US); Amber D. Huffman, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,100

(22) Filed: Dec. 21, 1999

(51) Int. Cl.$^7$ .............................. G06F 12/00
(52) U.S. Cl. .................. 711/112; 711/111; 711/113; 711/137; 711/213
(58) Field of Search .................. 711/112, 111, 113, 711/137, 213

(56) References Cited

U.S. PATENT DOCUMENTS

| | | | |
|---|---|---|---|
| 5,146,582 A | 9/1992 | Begun | 712/229 |
| 5,367,656 A * | 11/1994 | Ryan | 711/213 |
| 5,473,761 A * | 12/1995 | Parks et al. | 710/26 |
| 5,483,641 A * | 1/1996 | Jones et al. | 710/3 |
| 5,588,128 A * | 12/1996 | Hicok et al. | 711/137 |
| 5,600,817 A | 2/1997 | Macon, Jr. et al. | 711/137 |
| 5,619,723 A * | 4/1997 | Jones et al. | 710/3 |
| 5,623,308 A | 4/1997 | Civanlar et al. | 375/240.01 |
| 5,649,153 A * | 7/1997 | McNutt et al. | 711/118 |
| 5,652,858 A | 7/1997 | Okada et al. | 711/137 |
| 5,708,849 A | 1/1998 | Coke et al. | 395/842 |
| 5,721,865 A * | 2/1998 | Shintani et al. | 711/137 |
| 5,802,593 A * | 9/1998 | Grimsrud | 711/156 |
| 5,809,560 A * | 9/1998 | Schneider | 711/202 |
| 5,822,568 A | 10/1998 | Swanstrom | 395/500 |
| 5,835,783 A * | 11/1998 | Grimsrud | 710/5 |
| 5,845,297 A * | 12/1998 | Grimsrud et al. | 707/200 |
| 5,881,303 A * | 3/1999 | Hagersten et al. | 709/213 |
| 6,006,307 A | 12/1999 | Cherukuri | 711/114 |
| 6,085,287 A * | 7/2000 | O'Neil et al. | 711/113 |
| 6,195,726 B1 * | 2/2001 | Hogan | 386/35 |
| 6,212,603 B1 | 4/2001 | McInerney et al. | 711/125 |
| 6,298,424 B1 | 10/2001 | Lewchuk et al. | 711/158 |
| 6,317,810 B1 | 11/2001 | Lopez-Aguado et al. | 711/120 |
| 6,317,811 B1 | 11/2001 | Deshpande et al. | 711/137 |
| 6,449,111 B1 * | 9/2002 | Kool et al. | 360/48 |
| 6,449,698 B1 | 9/2002 | Deshpande et al. | 711/137 |

FOREIGN PATENT DOCUMENTS

| | | | |
|---|---|---|---|
| CN | 1029047 C | 6/1995 | G06F/13/16 |
| WO | WO99/34356 | 7/1999 | |

OTHER PUBLICATIONS

Soloviev, "Prefetching in Segmented Disk Cache for Multi-Disk Systems," pp 69–82, ACM, 1996.*

Tomkins et al., "Informed Multi-Process Prefetching and Caching," pp 100–114, ACM, 1997.*

Chinese Office Action dated Jan. 16, 2004.

* cited by examiner

*Primary Examiner*—Stephen Elmore
(74) *Attorney, Agent, or Firm*—Fish & Richardson P.C.

(57) ABSTRACT

Data is read from a storage medium in response to a command and stored in a region of memory. An interrupt is issued after a predetermined portion of the data has been stored in memory. A database, such as a scatter/gather list, may be consulted to determine when to issue the interrupt. A host processing device may read data from a first location on the storage medium in response to a command requesting data at a second location on the storage medium, and may read data from the second location on the storage medium in response to the command. The first location precedes the second location in a direction of movement of the storage medium during reading.

72 Claims, 4 Drawing Sheets

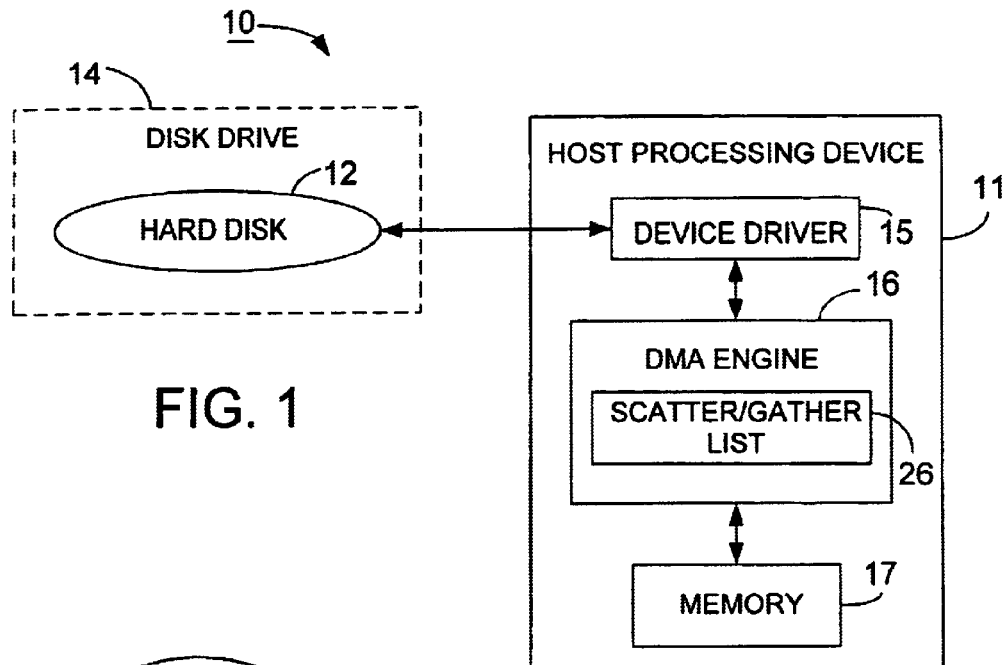
FIG. 1
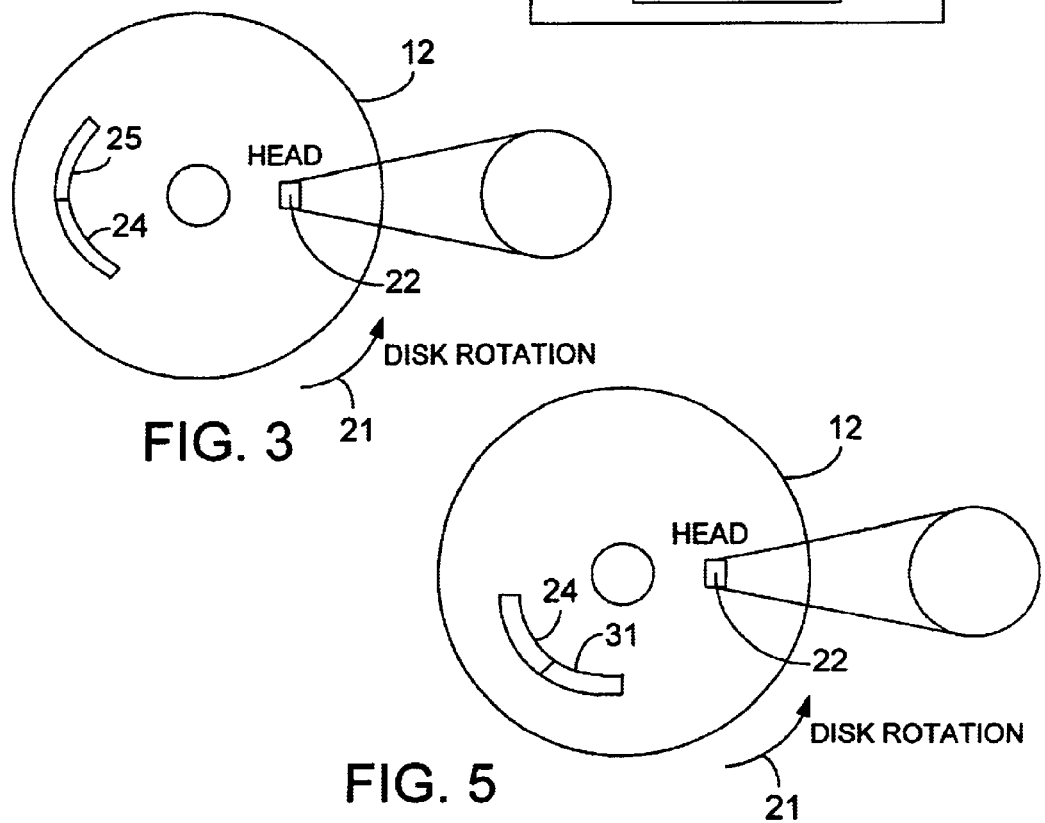
FIG. 3
FIG. 5

READING DATA FROM A STORAGE MEDIUM

BACKGROUND OF THE INVENTION

This invention relates to reading data from a storage medium.

When reading data from a storage medium, such as a hard disk, a host driver reads the requested data, called "demand data", along with data from other locations on the hard disk. The data from the other locations is called "prefetch data" and corresponds to addresses on the hard disk that are likely to be read next by the host driver.

SUMMARY OF THE INVENTION

In general, in one aspect, the invention is directed to reading data from a storage medium. The invention features reading data on the storage medium in response to a command, storing the data in a region of memory, and issuing an interrupt after a predetermined portion of the data has been stored in memory.

Among the advantages of the invention may be one or more of the following. The interrupt may be used to indicate that the predetermined portion of data has been read/stored. This data can then be processed without waiting for additional data to be read/stored. Thus, data from two (or more) locations of the storage medium can be read and processed separately using a single "read" command. This is particularly advantageous if the data at one such location is prefetch data, since processing of the data from the other location (demand data) would otherwise be held up unnecessarily to wait for the prefetch data to be read.

Other features and advantages will become apparent from the following description and the claims.

BRIEF DESCRIPTION OF THE DRAWINGS

FIG. 1 is a block diagram of a disk drive and a host processing device.

FIGS. 3 and 5 are top views of a hard disk and a transducer head in the disk drive.

DESCRIPTION

Figure 2:
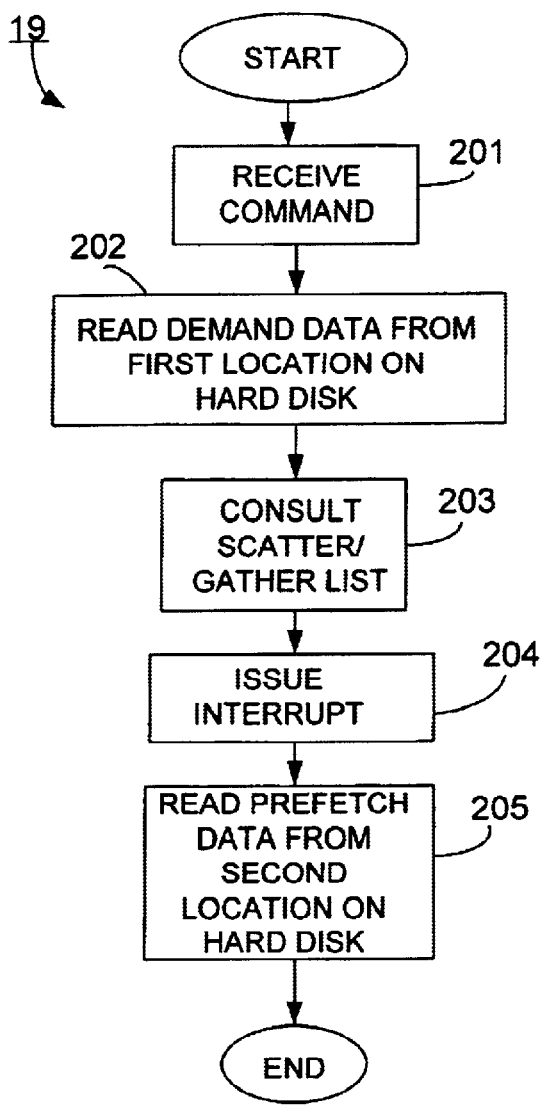
FIG. 2 is a flow diagram showing a process for reading data from the disk drive.

Referring to FIG. 1, block diagram 10 shows a host processing device 11 reading data from a hard disk 12 of a disk drive 14. Disk drive 14 may reside within host processing device 11 or it may be an external drive.

Software (device driver) 15 executing in host processing device 11 receives commands from applications or other computer program(s) (not shown) executing on host processing device 11. These commands instruct device driver 15 to read data from locations on hard disk 12 of disk drive 14. Data is then transferred from these locations back to device driver 15, which passes it to a Direct Memory Access ("DMA") engine 16 also on host processing device 11. DMA engine consults a table, such as scatter/gather list 26, to determine where in memory 17 to store the received data. Scatter/gather list 26 includes lists of addresses in memory 17 into which data from hard disk 12 is to be stored.

Issuing An Interrupt During Reading

In FIG. 2, a process 19 is shown for reading data from hard disk 12. Device driver 15 receives (201) a command from software on host processing device 11. The command identifies demand data and prefetch data at different addresses (locations) on hard disk 12, and instructs device driver 15 to read the demand and prefetch data from hard disk 12 on disk drive 14.

Demand and prefetch data are typically contiguous data blocks and the demand data precedes the prefetch data (i.e., the prefetch data is after the demand data) in a direction of movement of hard disk 12. For example, as shown in FIG. 3, hard disk 12 rotates in a direction of arrow 21 during reading. A transducer head 22 on disk drive 14 reads data from channels on hard disk 12 during rotation. Since the transducer head encounters demand data 24 before prefetch data 25 (as a result of the direction of rotation of hard disk 12), demand data 24 is read first. Prefetch data 25 is read on the assumption that the next data that will be read by transducer head 22 will be the data that follows data 24.

Returning to FIG. 2, in response to the command received in 201, device driver 15 reads (202) demand data 24 from hard disk 12 and provides the demand data to DMA engine 16. DMA engine 16 then consults (203) a database, namely a scatter/gather list 26, to determine where to store the data read in 202. Device driver 15 programs DMA engine 16 with scatter/gather list 26 prior to reading data from hard disk 12. Scatter/gather list 26 includes entries which specify destination buffers (regions of memory 17) into which the demand data and the prefetch data are to be placed. The destination regions of memory may not be contiguous, in which case DMA engine 16 is programmed with multiple entries, one for each discontiguous region.

DMA engine 16 consults (203) scatter/gather list 26 periodically as blocks (associated with "LBAs", or "Logical Block Addresses") of data are read. The frequency at which scatter/gather list 26 is consulted may vary depending upon the size of the blocks of data. However, the frequency is such that DMA engine 16 consults scatter/gather list 26 when DMA engine 16 reaches (or comes substantially near to) a boundary between the demand and prefetch data (as that data is read).

An entry (or entries), such as a flag, is provided in scatter/gather list 26 at the boundary between entries relating to the demand data and those relating to the prefetch data. As DMA engine 16 finishes with the demand data, it encounters this entry in scatter/gather list 26. When it encounters this entry, DMA engine 16 issues (204) an interrupt to signal the boundary between the demand and prefetch data. The interrupt is provided to device driver 15 which, in response, informs other processes (not shown) executing on host processing device 11 that the demand data has been read/stored. The demand data can then be processed or transmitted by these other processes, while DMA engine 16 continues to read (205) prefetch data 25.

By using a DMA-generated interrupt as set forth above, it is possible to read demand and prefetch data in response to a single command from device driver 15, and then to process the demand data while the prefetch data is still being read. Thus, process 19 reduces command overhead without sacrificing inherent advantages of obtaining prefetch data.

Reading Preceding Prefetch Data

Figure 4:
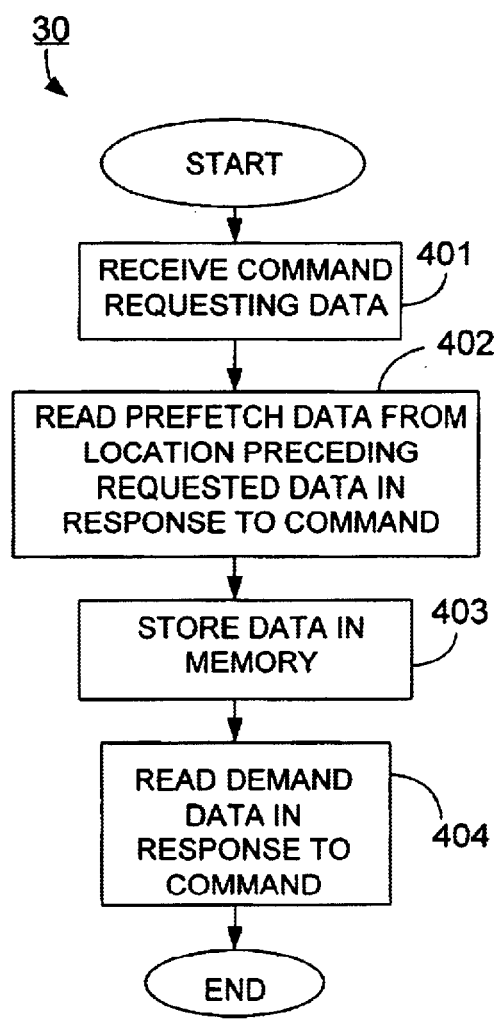
FIG. 4 is a flow diagram of an alternative process for reading data from the disk drive.

In FIG. 4, an alternative process 30 is shown for reading data from hard disk 12. Process 30 uses device driver 15 and DMA engine 16 to control reading from hard disk 12. Controlling reading directly from host processing device 11 brings to bear additional resources, such as processing power and memory, that are not otherwise available during reading. This is because processors in the host processing device generally operate at greater speeds, and have access to more available memory, than typical controllers which reside in, and control the operation of, disk drives. As a result, relatively large amounts of prefetch data can be read and stored using process 30.

Device driver 15 receives (401) a command from another computer program (for example, an application program running on host processing device 11). The command requests (demand) data from a specific location on hard disk 12. In response to the command, device driver 15 reads (402) data 31 that precedes the demand data 24 in a direction of motion of hard disk 12 (see FIG. 5). This "preceding" prefetch data 31 may be adjacent to demand data 24, as shown in FIG. 5, or it may be located at some other prior point relative to the demand data on hard disk 12.

Generally speaking, it does not take additional time to read data 31, since transducer head 22 will pass data 31, in order to read demand data 24. While hard disk 12 is being moved into position, transducer head 22 will pass over data 31, during which time transducer head 22 reads that data. The data is stored (403) in memory 17 (or otherwise processed) on host processing device 11. Storage is performed via DMA engine 16 and scatter/gather list 26, as described above.

Process 30 meanwhile reads (404) demand data 24 from hard disk 12 in response to the same command received in 401. Thus, a single command can be used to read both prefetch and demand data. Process 30 may also read prefetch data that follows the demand data in a direction of motion of hard disk 12. Process 19 may be used to read this prefetch data, or the prefetch data may be read using host processing device 11. Process 30 may be repeated for plural sectors of hard disk 12 and for plural entries of the scatter/gather list.

Hardware

Figure 6:
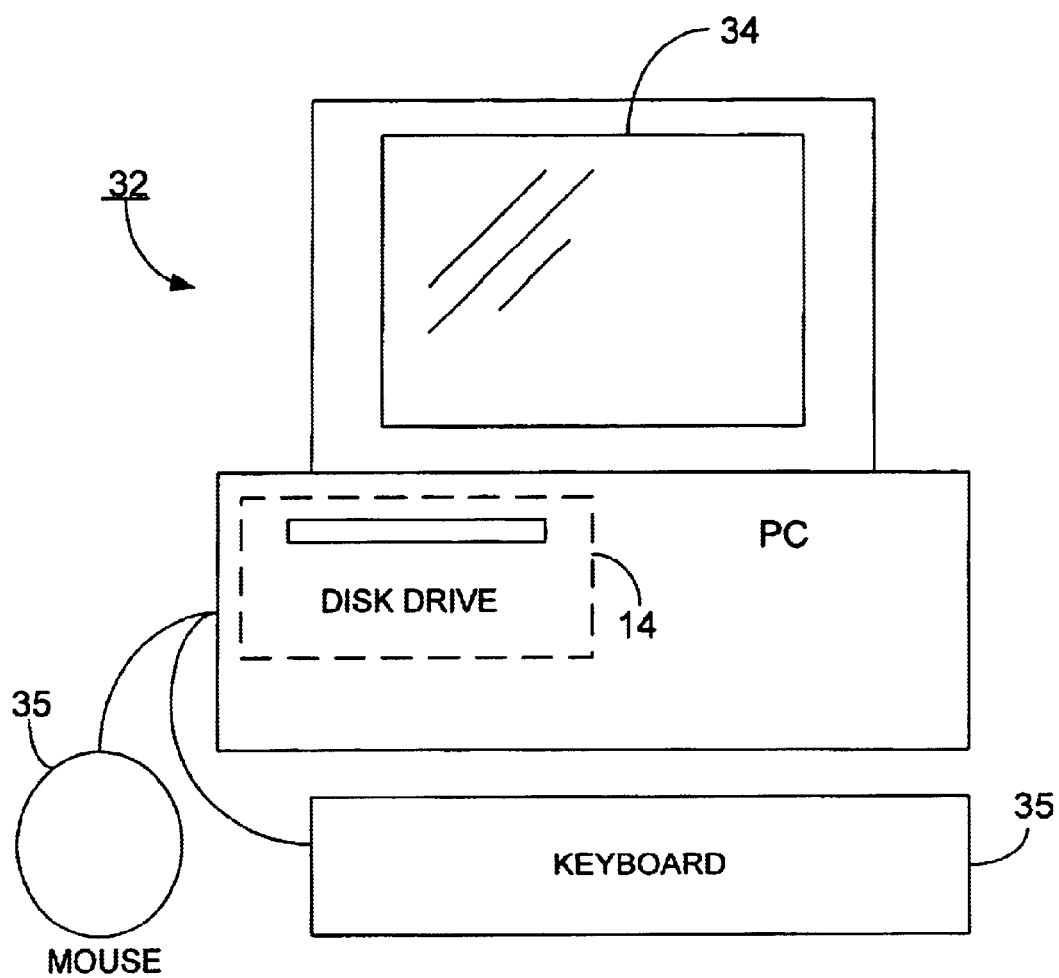
FIG. 6 is a front view of a computer which can function as the host processing device.

Hardware on which processes 19 and 30 may be implemented is shown in FIG. 6. Personal computer ("PC") 32 includes disk drive 14 which reads and writes data on a hard disk, a display screen 34 which displays information to a user, and input devices 35 which input data. A controller 36 (FIG. 7) in PC 32 runs device driver 15 and DMA engine 16 using scatter/gather list 26 (stored in memory 17) and functions as the host processing device.

Figure 7:
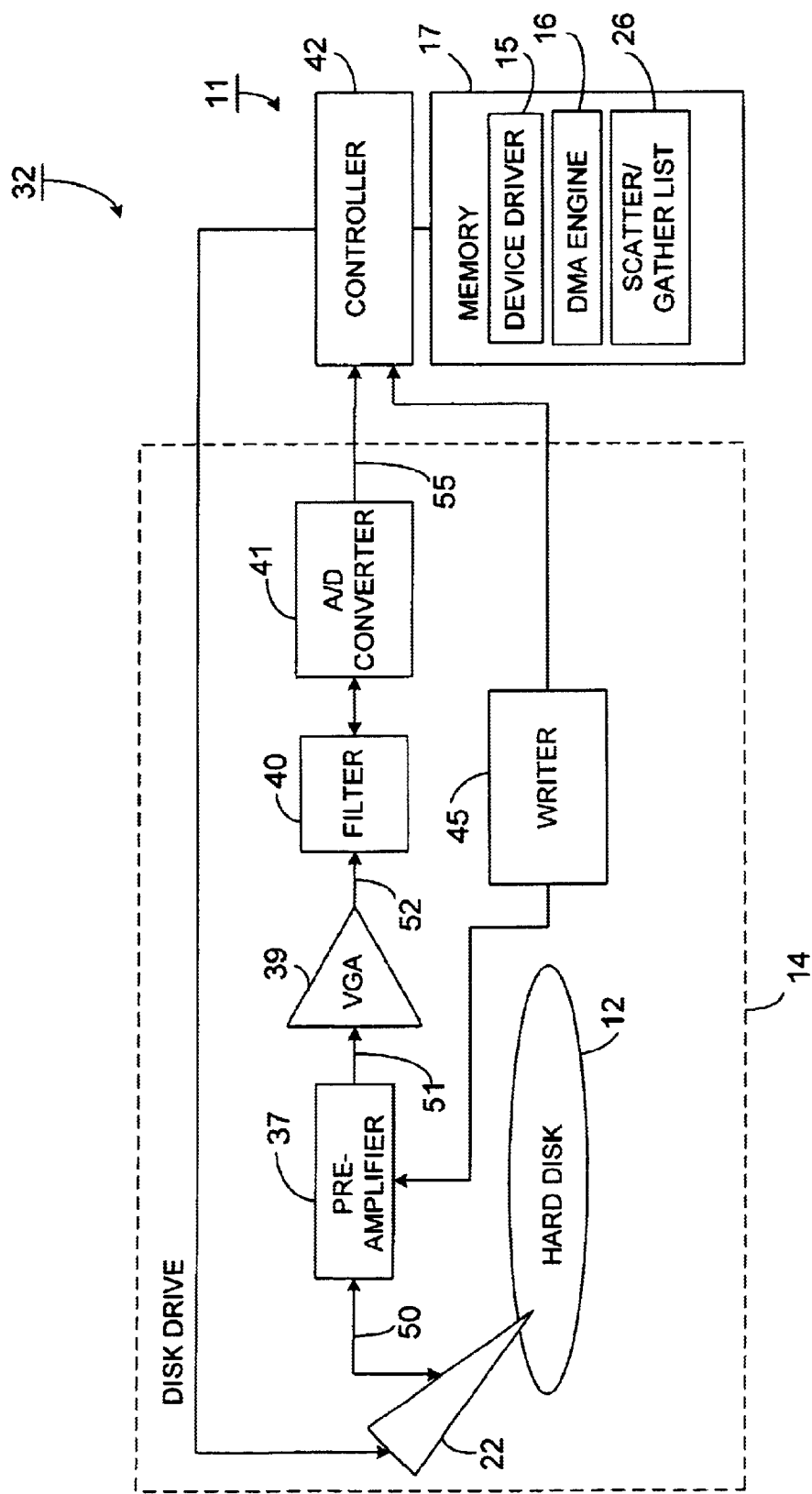
FIG. 7 is a block diagram of hardware included in the disk drive and the host processing device.

FIG. 7 also shows components of disk drive 14. Among these components are hard disk 12, transducer head 22, pre-amplifier 37, analog variable gain amplifier ("VGA") 39, filter 40, analog-to-digital ("A/D") converter 41, controller 42 (including memory 27), and writer 45.

Hard disk 12 is a magnetic disk having concentric data storage channels defined on each of its storage surfaces. Hard disk 12 is rotated inside disk drive 14 while data is read from/written to its channels. Although only one hard disk 12 is shown, more than one disk may be included in disk drive 14.

Transducer head 22 is a magneto-resistive head (or similar device) that is capable of reading data from, and writing data to, hard disk 12. Transducer head 22 is associated in a "flying" relationship over a storage surface of hard disk 12, meaning that it is movable relative to, and over, the storage surface in order to read and write data.

To read data from hard disk 12, device driver 15 (executing in controller 42) sends a signal to transducer head 22 to move transducer head 22 to locations on hard disk 12 from which data is to be read (process 19).

Transducer head 22 senses flux transitions as it "flies" in close proximity to a specified location on hard disk 12. These flux transitions 50 are provided to pre-amplifier 37. Pre-amplifier 37 is a voltage pre-amplifier that amplifies the flux transitions from millivolts (mV) to volts (V). The resulting pre-amplified analog signal (or "read" signal) 51 is provided to VGA 39. VGA 39 further amplifies read signal 51 and provides a resulting amplified read signal 52 to filter 40.

Filter 40 is an analog filter/equalizer that generates a substantially square wave from amplified read signal 52. To this end, filter 40 is programmed in accordance with the data transfer rate of a data zone on hard disk 12 from which signal 52 ultimately originated. Resulting filtered signal 54 is subjected to sampling and quantization within high-speed A/D converter 41. A/D converter 41 outputs digital data 55 generated from signal 54. Data 55 corresponds to the data stored on hard disk 12.

Writer 45 is provided for writing data to hard disk 12 (via transducer head 22). Memory 27 stores computer instructions (including firmware for device driver 15) for implementing process 19. Memory 27 also stores scatter/gather list 26.

Processes 19 and 30 are not limited to use with this foregoing hardware and software configurations; they may find applicability in any computing or processing environment. Processes 19 and 30 may be implemented in hardware, software, or a combination of the two. Processes 19 and 30 may be implemented in computer programs executing on programmable computers that each include a processor, a storage medium readable by the processor (including volatile and non-volatile memory and/or storage elements), at least one input device, and one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., hard disk or magnetic diskette) that is readable by a general or special purpose programmable computer for configuring and operating the computer when the storage medium or device is read by the computer to perform processes 19 and 30. Processes 19 and 30 may also be implemented as a computer-readable storage medium, configured with a computer program, where, upon execution, instructions in the computer program cause the computer to operate in accordance with processes 19 and 30.

Other embodiments not specifically described herein are also within the scope of the following claims. For example, features of processes 19 and 30 can be combined in a single embodiment. Additional entries may be added to scatter/gather list 26 to cause DMA engine 16 to issue additional interrupts. Processes 19 and 30 can be used to access data stored on other storage media, including optical media, such as CDs ("Compact Disks"), DVDs ("Digital Video Disks"), and DLT ("Digital Linear Tape"). Device driver 15 may be an ATA ("Advanced Technology Attachment") driver. Processes 19 and 30 may be executed in a different order from that shown and/or one or more steps thereof may be executed concurrently. The invention may be used with other storage media, such as optical disk drives and magnetic recording devices.

What is claimed is:

1. A method of reading data from a storage medium, comprising:
   reading data on the storage medium in response to a command, the data comprising prefetch data and demand data;
   storing the demand data in a region of memory; and
   issuing an interrupt after the demand data has been stored in memory and while the prefetch data is being read.

2. The method of claim 1, further comprising consulting a database to determine when to issue the interrupt.

3. The method of claim 2, wherein the database comprises instructions for storing the data and for issuing the interrupt.

4. The method of claim 2, wherein the database comprises a scatter/gather list.

5. The method of claim 1, wherein the demand data is read from a first location on the storage medium and the prefetch data is read from a second location on the storage medium, the first location preceding the second location in a direction of movement of the storage medium during reading.

6. The method of claim 5, further comprising reading additional prefetch data from a third location on the storage medium, tie third location preceding the first and second locations in a direction of movement of the storage medium during reading.

7. A method by which a host processing device reads data from a storage medium of a disk drive, comprising:
   reading data from a first location on the storage medium in response to a command requesting data at a second location on the storage medium; and
   reading data from the second location on the storage medium in response to the command, the first location preceding the second location in a direction of movement of the storage medium during reading;
   wherein reading data from the first location and reading data from the second location are performed as part of a single access of the storage medium in response to the command.

8. The method of claim 7, wherein the first location is adjacent to the second location.

9. The method of claim 7, further comprising reading data from a third location on the storage medium, the third location following the second location in the direction of movement of the storage medium during reading.

10. The method of claim 9, wherein the third location is adjacent to the second location.

11. The method of claim 7, further comprising receiving the command from a computer program executing on the host processing device.

12. The method of claim 7, further comprising storing data read from the first and second locations in a memory on the host processing device.

13. A machine-readable medium that stores instructions to read data from a storage medium, the instructions causing a machine to:
   read data on the storage medium in response to a command, the data comprising prefetch data and demand data;
   store the demand data in a region of memory; and
   issue an interrupt after the demand data has been stored in memory and while the prefetch data is being read.

14. The machine-readable medium of claim 13, further comprising instructions that cause the machine to consult a database to determine when to issue the interrupt.

15. The machine-readable medium of claim 14, wherein the database comprises instructions for storing the data and for issuing the interrupt.

16. The machine-readable medium of claim 14, wherein the database comprises a scatter/gather list.

17. The machine-readable medium of claim 13, wherein the demand data is read from a first location on the storage medium and the prefetch data is read from a second location on tire storage medium, the first location preceding the second location in a direction of movement of the storage medium during reading.

18. The machine-readable medium of claim 17, further comprising instructions that cause the machine to read additional prefetch data from a third location on the storage medium, the third location preceding the first and second locations in a direction of movement oft he storage medium during reading.

19. A computer program stored on a computer-readable medium which causes a host processing device to read data from a storage medium of a disk drive, the computer program comprising instructions that cause the host processing device to:
   read data from a first locution on the storage medium in response to a command requesting data at a second location on the storage medium; and
   read data from the second location on the storage medium in response to the command, the first location preceding the second location in a direction of movement of the storage medium during reading;
   wherein reading data from the first location and reading data from the second location are performed as part of a single access of the storage medium in response to the command.

20. The computer program of claim 19, wherein the first location is adjacent to the second location.

21. The computer program of claim 19, further comprising instructions that cause the host processing device to read data from a third location on the storage medium, the third location following the second location in the direction of movement of the storage medium during reading.

22. The computer program of claim 21, wherein the third location is adjacent to the second location.

23. The computer program of claim 19, further comprising instructions that cause the host processing device to receive the command from a computer program executing on the host processing device.

24. The computer program of claim 19, further comprising instructions that cause the host processing device to store data read from the first and second locations in a memory on the host processing device.

25. An apparatus for reading data from a storage medium, comprising:
   a memory which stores computer instructions; and
   a processor which executes the computer instructions to (i) read data on the storage medium in response to a command, the data comprising prefetch data and demand data, (ii) store the demand data in a region of memory, and (iii) issue an interrupt after the demand data has been stored in memory and while the prefetch data is being read.

26. The apparatus of claim 25, wherein the processor executes computer instructions to consult a database to determine when to issue the interrupt.

27. The apparatus of claim 26, wherein the database comprises instructions for storing the data and for issuing the interrupt.

28. The apparatus of claim 25, wherein the demand data is read from a first location on the storage medium and the prefetch data is read from a second location on the storage medium, the first location preceding the second location in a direction of movement of the storage medium during reading.

29. An apparatus for reading data from a storage medium of a disk drive, comprising:
    a memory which stores computer instructions; and
    a processor which executes the computer instructions to (i) read data from a first location on the storage medium in response to a command requesting data at a second location on the storage medium, and (ii) read data from the second location on the storage medium in response to the command, the first location preceding the second location in a direction of movement of the storage medium during reading;
    wherein reading data from the location and reading data from the second location are performed as part of a single access of the storage medium in response to the command.

30. The apparatus of claim 29, wherein the first location is adjacent to the second location.

31. A method of reading data from a storage medium, comprising:
    reading data on the storage medium in response to a command;
    storing the data in a region of memory; and
    consulting a database to determine when to issue an interrupt;
    wherein the interrupt is issued after a predetermined portion of the data has been stored in memory.

32. The method of claim 31, wherein the database comprises instructions for storing the data and for issuing the interrupt.

33. The method of claim 31, wherein the database comprises a scatter/gather list.

34. The method of claim 31, wherein the predetermined portion of data is read from a first location on the storage medium and additional data is read from a second location on the storage medium, the fit location preceding the second location in a direction of movement of the storage medium during reading.

35. The method of claim 34, further comprising reading data from a third location on the storage medium, the third location preceding the first and second locations in a direction of movement of the storage medium during reading.

36. A machine-readable medium that stores instructions to read data from a storage medium, the instructions causing a machine to:
    read data on the storage medium in response to a command;
    store the data in a region of memory; and
    consult a database to determine when to issue an interrupt;
    wherein the interrupt is issued after a predetermined portion of the data has been stored in memory.

37. The machine-readable medium of claim 36, wherein the database comprises instructions for storing the data and for issuing the interrupt.

38. The machine-readable medium of claim 36, wherein the database comprises a scatter/gather list.

39. The machine-readable medium of claim 36, wherein the predetermined portion of the data is read from a first location on the storage medium and additional data is read from a second location on the storage medium, the first location preceding the second location in a direction of movement of the storage medium during reading.

40. The machine-readable medium of claim 39, further comprising instructions that cause the machine to read data from a third location on the storage medium, the third location preceding the first and second locations in a direction of movement of the storage medium during reading.

41. An apparatus for reading data from a storage medium, comprising:
    a memory which stores computer instructions; and
    a processor which executes the computer instructions to (i) read data on the storage medium in response to a command, (ii) store the data in a region of memory, and (iii) consult a database to determine when to issue the interrupt;
    wherein the interrupt is issued after a predetermined portion of the data has been stored in memory.

42. The apparatus of claim 41, wherein the database comprises instructions for storing the data and for issuing the interrupt.

43. The apparatus of claim 41, wherein the database comprises a scatter/gather list.

44. The apparatus of claim 41, wherein the predetermined portion of data is read from a first location on the storage medium and additional data is read from a second location on the storage medium, the first location preceding the second location in a direction of movement of the storage medium during reading.

45. The apparatus of claim 44, wherein the processor executes instructions to read data from a third location on the storage medium, the third location preceding the first and second locations in a direction of movement of the storage medium during reading.

46. A method of reading data from a storage medium, comprising:
    reading data on the storage medium in response to a command, the data comprising prefetch data and demand data;
    storing the demand data in a region of memory; and
    issuing an interrupt after the demand data has been stored in memory;
    wherein the demand data is read from a first location on the storage medium and the prefetch data is read from a second location on the storage medium, the first location preceding the second location in a direction of movement of the storage medium during reading.

47. The method of claim 46, further comprising consulting a database to determine when to issue the interrupt.

48. The method of claim 47, wherein the database comprises instructions for storing the data and for issuing the interrupt.

49. The method of claim 47, wherein the database comprises a scatter/gather list.

50. The method of claim 46, further comprising reading additional prefetch data from a third location on the storage medium, the third location preceding the first and second locations in a direction of movement of the storage medium during reading.

51. A machine-readable medium that stores instructions to read data from a storage medium; the instructions causing a machine to:
    read data on the storage medium in response to a command, the data comprising prefetch data and demand data;
    store the demand data in a region of memory; and
    issue an interrupt after the demand data has been stored in memory;
    wherein the demand data is read from a first location on the storage medium and the prefetch data is read from a second location on the storage medium, the first location preceding the second location in a direction of movement of the storage medium during reading.

52. The machine-readable medium of claim 51, further comprising instructions that cause the machine to consult a database to determine when to issue the interrupt.

53. The machine-readable medium of claim 52, wherein the database comprises instructions for storing the data and for issuing the interrupt.

54. The machine-readable medium of claim 52, wherein the database comprises a scatter/gather list.

55. The machine-readable medium of claim 52, further comprising instructions that cause the machine to read additional prefetch data from a third location on the storage medium, the third location preceding the first and second locations in a direction of movement of the storage medium during reading.

56. An apparatus for reading data from a storage medium, comprising:
  a memory which stores computer instructions; and
  a processor which executes the computer instructions to (i) read data on the storage medium in response to a command, the data comprising prefetch data and demand data, (ii) store the demand data in a region of memory, and (iii) issue an interrupt after the demand data has been stored in memory;
  wherein the demand data is read from a first location on the storage medium and the prefetch data is read from a second location on the storage medium, the first location preceding the second location in a direction of movement of the storage medium during reading.

57. The apparatus of claim 56, wherein the processor executes instructions to consult a database to determine when to issue the interrupt.

58. The apparatus of claim 57, wherein the database comprises instructions for storing the data and for issuing the interrupt.

59. The apparatus of claim 57, wherein the database comprises a scatter/gather list.

60. The apparatus of claim 56, further comprising reading additional prefetch data from a third location on the storage medium, the third location preceding the first and second locations in a direction of movement of the storage medium during reading.

61. A method of reading data from a storage medium, comprising:
  reading data on the storage medium in response to a command, the data comprising prefetch data and demand data, the prefetch data being read from an area of the storage medium that precedes the demand data in a direction of movement of the storage medium during reading and from an area of the storage medium the follows the demand data in a direction of movement of the storage medium during reading;
  storing the demand data in a region of memory; and
  issuing an interrupt after the demand data has been read.

62. The method of claim 61, further comprising consulting a database to determine when to issue the interrupt.

63. The method of claim 62, wherein the database comprises instructions for storing the data and for issuing the interrupt.

64. The method of claim 62, wherein the database comprises a scatter/gather list.

65. A machine-readable medium that stores instructions to read data from a storage medium, the instructions causing a machine to:
  read data on the storage medium in response to a command, the data comprising prefetch data and demand data, the prefetch data being read from an area of the storage medium tat precedes the demand data in a direction of movement of the storage medium during reading and from an area of the storage medium the follows the demand data in a direction of movement of the storage medium during reading;
  store the demand data in a region of memory; and
  issue an interrupt after the demand data has been read.

66. The machine-readable medium of claim 65, further comprising instructions that cause the machine to consult a database to determine when to issue the interrupt.

67. The machine-readable medium of claim 66, wherein the database comprises instructions for storing the data and for issuing the interrupt.

68. The machine-readable medium of claim 66, wherein the database comprises a scatter/gather list.

69. An apparatus for reading data from a storage medium, comprising:
  a memory which stores computer instructions; and
  a processor which executes the computer instructions to (i) read data on the storage medium in response to a command, the data comprising prefetch data and demand data, the prefetch data being read from an area of the storage medium that precedes the demand data in a direction of movement of the storage medium during reading and from an area of the storage medium the follows the demand data in a direction of movement of the storage medium during reading, (ii) store the demand data in a region of memory, and (iii) issue an interrupt after the demand data has been read.

70. The apparatus of claim 69, wherein the processor executes instructions to consult a database to determine when to issue the interrupt.

71. The apparatus of claim 70, wherein the database comprises instructions for storing the data and for issuing the interrupt.

72. The apparatus of claim 70, wherein the database comprises a scatter/gather list.

* * * * *